Aug. 29, 1967     B. O. D. BLADEL     3,338,794
CULTURING ANAEROBIC BACTERIA

Filed Nov. 23, 1964     2 Sheets-Sheet 1

INVENTOR.
BENDT O. D. BLADEL
BY
ATTORNEY.

United States Patent Office 3,338,794
Patented Aug. 29, 1967

3,338,794
CULTURING ANAEROBIC BACTERIA
Bendt O. D. Bladel, Oak Lawn, Ill., assignor to Swift & Company, Chicago, Ill., a corporation of Illinois
Filed Nov. 23, 1964, Ser. No. 413,230
1 Claim. (Cl. 195—126)

The present invention relates to a novel method and article of manufacture for culturing microorganisms, and more specifically to a disposable device for culturing aerobic and anaerobic microorganisms which is especially adapted for use in ordinary laboratory incubation and assay equipment.

Traditionally, the culturing of anaerobic microorganisms has been accomplished by two techniques. In the first of these a liquid containing the microorganisms to be cultured is streaked upon the surface of a solid nutrient medium containing a reducing compound and the dish is then covered with a special lid, commonly known as a Brewer lid. These lids are air-tight and prevent the absorption of oxygen, thus eliminating the necessity of culturing the organisms in an oxyen-free atmosphere. However, Brewer lids have the disadvantage of being quite expensive, and therefore not disposable. Perhaps more important, they often cause a film of water to be condensed upon the surface of the nutrient medium, resulting in the coalescing of bacterial colonies which, of course, makes pure culture isolation and convenient assay impossible.

The second method in general use today, usually preferred over the use of Brewer lids, involves the incubation of anaerobic microorganisms in an oxygen-free atmosphere. First, the sample is prepared by either the conventional streaking technique or the pour plate technique, in either event a special reducing medium being employed. The creation of an oxygen-free atmosphere, however, often creates difficulties. There are two methods commonly employed. First, the incubator may be first evacuated and then backfilled with an inert gas such as nitrogen. This is probably the most popular method today because of its dependability. An alternate method for producing an oxygen-free atmosphere involves the chemical elimination of oxygen from the air inside the incubator. Quite clearly, either of these methods necessitates the use of relatively expensive equipment along with the expenditure of large amounts of time.

Another method of culturing anaerobic microorganisms involves the use of agar deeps in test tubes. While specially shaped tubes are available for this technique, they are expensive and limited in their usefulness, and therefore are seldom found in most laboratories. The more usual procedure involves the use of an ordinary test tube. The greatest difficulty encountered with this technique is that the isolated colony is deep in the agar medium, and it is therefore most difficult to recover. Furthermore, this method is very difficult for use in the quantitative assay of suspensions because the distoration produced by a test tube makes the counting of colonies very difficult.

In an attempt to solve some of the many problems enumerated above, attempts have been made to devise a simple, inexpensive, disposable device for the culturing of anaerobic microorganisms which would not require the use of costly and time consuming techniques required for the removal of the oxygen environment prior to the incubation period. Most of these attempts have been centered around the use of flexible plastic containers which are air-impermeable after the microorganisms have been introduced. However, none of these devices has received any widespread commercial popularity for several reasons. First of all, these devices are often somewhat elaborate in design, and therefore difficult and unreliable to use. Generally, this elaborate design is a result of various attempts to provide a method for bringing the organisms to be cultured into contact with the nutrient medium while maintaining anaerobic conditions. Thus, such devices often incorporate various types of semi-permeable barriers between the nutrient medium and the organisms.

A second difficulty often encountered with disposable anaerobic culturing devices now in use is that their design is often directed toward relatively specialized applications, and they are therefore not easily adapted to general laboratory use.

Because of the aforementioned elaborate design characteristics and the various types of specialized uses to which the devices are directed, the shapes of various disposable anaerobic culturing devices are not conveniently adapted for use in conventional laboratory equipment for the counting of bacterial colonies. Such equipment, of which the well-known Quebec counter is the most popular, is designed to accommodate an ordinary round Petri dish. Because of the round counting area on the device, the various types of proposed specialized disposable culturing devices are not adaptable for use in such a counter.

Some of the difficulties enumerated above are also sometimes encountered in the conventional Petri dish culturing of aerobic microorganisms. Specifically, a moisture layer sometimes condenses on the underside of the dish cover during incubation. If this water comes into contact with the nutrient medium it may ruin the culture by causing the colonies to coalesce. Furthermore, although the conventional plastic Petri dishes are relatively low in cost, it is still relatively expensive to dispose of them after only a single use.

It is therefore an object of the present invention to provide an improved disposable device and method for culturing microorganisms.

It is another object of the present invention to provide an improved disposable microorganism culturing device having a substantially circular portion adapted for use in conventional laboratory counting equipment.

It is another object of the present invention to provide an improved disposable anaerobic microorganism culturing device which may be incubated in common laboratory incubation equipment.

Another object of the present invention is to provide an improved, disposable device for culturing microoganisms incorporating means for conveniently dividing the device into sections.

Another object of the present invention is to provide an improved, disposable device for culturing microorganisms which incorporates means to facilitate opening of the device.

Generally, the present invention relates to an improved, disposable device for culturing microorganisms which, because of its circular culturing portion, is adapted for convenient use on the circular screen of the ordinary Quebec counter. The device is formed of two congruent sheets of sterilizable, pliable, light-transmittant material, each of which has a circular portion. These sheets are sealed to one another along a major portion of the circumferential edge of the circular portion, while providing an open conduit means for introducing a sample and a nutrient medium into the device. The culturing device thus formed has a relatively flat, disc-shaped receptacle wherein the bacteria may be cultured and counted.

Proper selection of the material used in forming the device is very important. Although it is necessary that both sheets be light transmittant, it is only necessary that one of the sheets be transparent, while the other may be translucent or transparent. When one of the sheets is only translucent, the user will, of course, be limited to observation of the bacterial growth within the device from only the transparent side of the receptacle. When the device is used for culturing anaerobic microorganisms, it is necessary that the material be oxygen-impermeable, while use for aerobic microorganisms required an oxygen-permeable material which will not permit the passage of liquids.

Further objects and advantages of the present invention will become apparent from the following detailed description and drawings in which.

Figure 1:
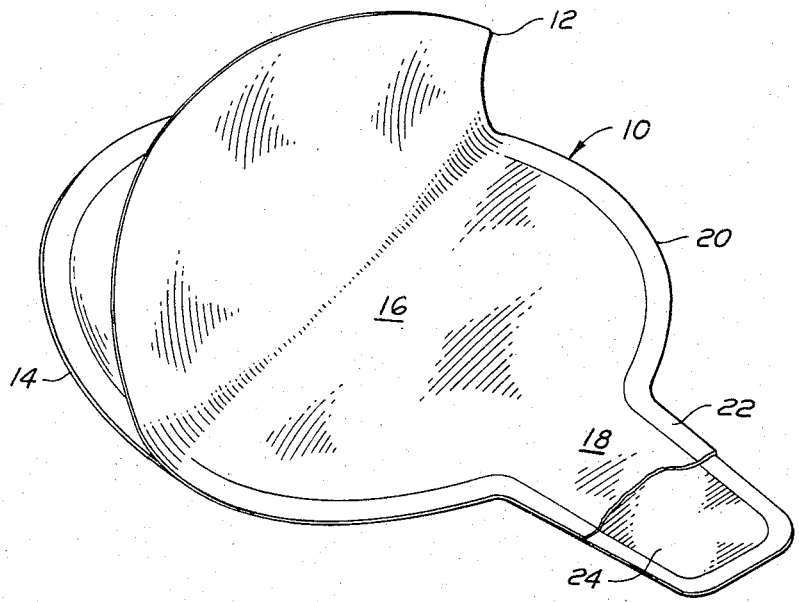
FIGURE 1 is a perspective view of a partially formed device.

Referring to FIGURE 1, the bacteria culturing device generally 10, is formed of two sheets of pliable, light-transmittant material 12, 14. These sheets are of the same size and shape, and therefore are referred to as "congruent." In the embodiment shown, each of these sheets has a circular portion 16 and a strip portion 18, having oppositely disposed edges 20, extending outwardly from the circumferential edge of the circular portion 16. When the device is assembled, the sheets are sealed to one another along the circumferential edge of the circular portion 16 and also along the outwardly extending edges 20 of the strip portions 18, forming a flange 22. The circular portions 16 are sealed to one another only at the outer circumferential edges and the strip portions 18 are sealed to one another only at the oppositely disposed, outwardly extending edges 20, forming a filling neck. This filling neck provides a conduit means 24 to allow the introduction of fluids into the device 10. Usually, the length of one strip portion extends beyond the length of the other to facilitate filling of the device.

In order to provide for convenient observation of bacterial growth, and also to make convenient the counting of colonies, it is important that the contents of the bag be visible. For this reason, it is essential that at least one of the sheets of material 12, 14 be transparent. While in most cases it is preferred that both sheets 12, 14 be transparent, it is sometimes more convenient that one of these sheets be only translucent because of the light-dispersive properties it offers as a backing material.

When the device 10 is to be employed for the culturing of anaerobic microorganisms, it is essential that it be formed of material which is impermeable to oxygen, and further that the sheets of material 12, 14 be hermetically sealed to one another along the flange 22.

Figure 2:
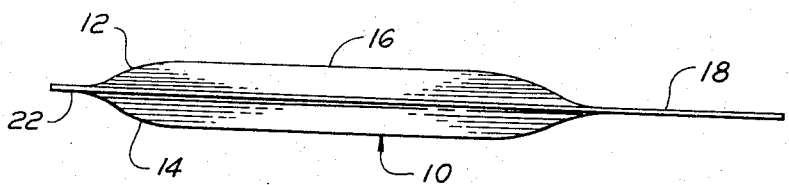
FIGURE 2 is a side elevation of the preferred device.

FIGURE 2 shows the completely assembled device 10 as it would appear when the circular receptacle portion is filled with a solidified nutrient medium such as agar, and the filling neck is preferably sealed. When the device is formed of thermoplastic material, this sealing is easily accomplished by simply heat-sealing the strip portions 18 of the sheets 12, 14 to one another. It should be realized, however, that heat-sealing is not mandatory inasmuch as the solidification of the agar at the base of conduit 24 results in an air-impermeable seal.

Figure 3:
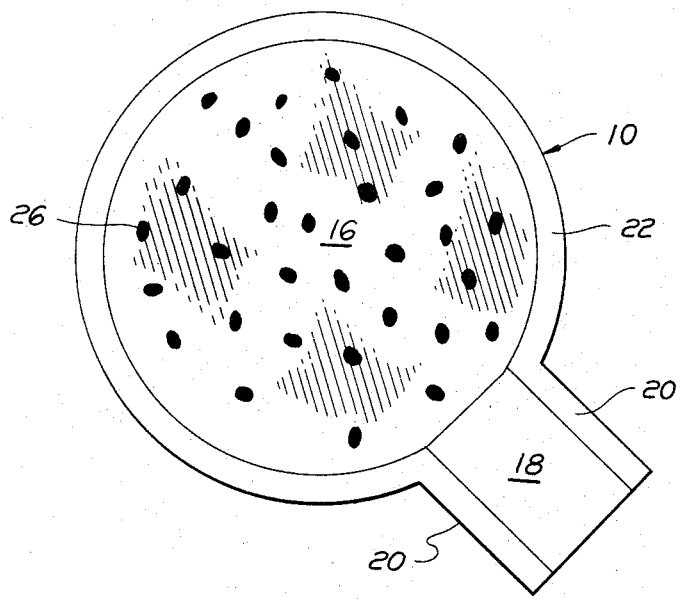
FIGURE 3 is a perspective view of the preferred device showing its appearance after the incubation of microorganisms.

Referring to FIGURE 3, the device 10 is shown as it would appear after the incubation of bacteria to form colonies 26. As will appear from the figure, these colonies 26 are discrete and well defined in the culturing device of the present invention, and may therefore be easily counted. Furthermore, the advantageous circular shape makes possible the counting of the colonies upon the circular counting area of a conventional Quebec counter. This especially simplifies the assay of a sample of anaerobic microorganisms, making the simplicity comparable to conventional Petri dish assay of aerobic microorganisms.

Figure 4:
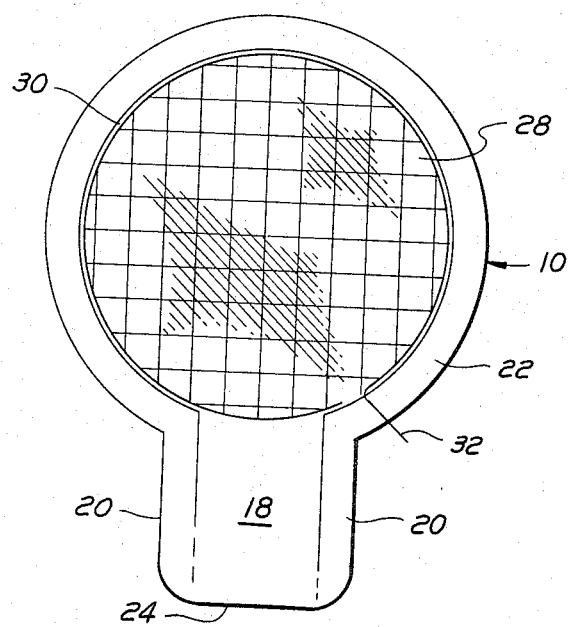
FIGURE 4 is a plan view of a modified device.

FIGURE 4 depicts a modification of the present bacteria culturing device 10 which incorporates a grid pattern 28 and a tear string 30 embedded within the circular receptacle portion of the device along the circumference thereof. The grid pattern 28 is often useful when a very large number of colonies are obtained, making a count of the total number in the bag most tedious. In this event, it is preferred to count only a portion of the colonies in the device and to determine the total number by the use of a multiplication factor. When this technique is employed, the grid pattern 28 serves as a convenient reference to isolate that section in which the bacteria are to be counted.

In addition to the quantitative assay of microbial samples, the present culturing device is also useful for the purification of microorganisms. Thus, an impure sample may be cultured and purified by "picking" an individual colony of pure culture. In order to make this technique most convenient, it is desirable that a tear string 30 be located around the circumference of the circular portion of the device enabling the user to simply pull the string and open the bag. The tear string 30 has a portion 32 which extends outwardly from the circumferential edge of the device enabling the user to grasp it easily. This exposes the colonies, making the removal of an individual colony a relatively simple process.

Because the device of the present invention is designed for convenient use with the conventional Quebec counter, it is preferred that its overall diameter be the same as that of an ordinary Petri dish, for which the Quebec counter is designed. Thus, the counting area should generally have an overall diameter of about 90 mm. or 3½ inches, although the size may be varied to suit the requirements of any particular situation.

To use the device of the present invention, the microbes under study are suspended in a liquified nutrient medium such as liquified agar. To culture anaerobic microorganisms it is preferable that the nutrient medium contain a reducing compound to minimize the effect of any oxygen which may be present. The preparation of the sample at this point is similar to the method which would be used in preparing a sample for the conventional pour plate technique. After the sample has been prepared, it is transferred to a pipette and the tip of the pipette is inserted into the previously sterilized device 10 via the conduit means 24 so that it reaches the circular receptacle portion 16. The liquid is allowed to flow into the circular receptacle with care taken that none of the liquid remains in the filling neck formed from the strip portions 18. As an alternate method, the molten nutrient medium and the microorganisms may be introduced separately.

After filling, the pliable receptacle is compressed, usually manually, i.e., by being placed between two parallel surfaces in order to force air out and to allow the liquid agar to completely fill the circular portion 16. The filling neck is then closed by sealing the strip portions 18 of the pliable sheets 12, 14 to one another. When the device is formed of thermoplastic material, this is easily accomplished by heat-sealing. After the nutrient medium has solidified, the sealed device is placed in a conventional incubator for the desired length of time. When removed, the device, which should appear similar to that depicted in FIGURE 3, is placed upon a conventional Quebec counter for colony counting. After use, the sealed device may simply be discarded with no danger of bacterial contamination of the surroundings.

The material to be used in the formation of the present culturing device depends upon the specific use to which it is put. When the device is to be used for the culturing of anaerobic microorganisms, it must be formed from sterilizable pliable materials which are oxygen-impermeable, and is preferably prepared from those materials which are easily manually deformed, and can be heat-sealed to one another. Flexible films of polyesters, polyamides, polyolefins can be used in forming the oxygen-permeable or oxygen-impermeable packages. These films can be coated with films of other resins. Specific polymers and copolymers useable in producing films applicable herein are polyvinyl chloride, polyvinylidene chloride and copolymers thereof as well as copolymers of polyvinyl chloride and polyvinyl acetate. Other synthetic thermoplastic polymers which can be used are polyvinyl alcohol terephthalic acid esters polypropylene, polybutylene and combinations thereof. Laminated materials containing an oxygen barrier are generally preferred. Examples of such laminates include cellophane-Saran-polyethylene, Mylar-Saran-polyethylene, Nylon-Saran-polyethylene, and the like.

When the present device is to be employed in the culturing of aerobic microorganisms, it is prepared from sterilizable, pliable, oxygen-permeable materials which are impermeable to liquids. These are also preferably easily manually deformed and heat-sealable. Examples of such material include polyethylene or cellophane.

Obviously, many modifications and variations can be made without departing from the spirit and scope of the present invention, and therefore only such limitations should be imposed as are indicated by the appended claim.

I claim:

A method for culturing anaerobic microorganisms comprising: introducing solidifiable liquefied nutrient medium and microorganisms into a device which comprises two flat, congruent sheets of pliable, moisture-impermeable oxygen-impermeable, light-transmittant material, at least one of said sheets being transparent, said sheets each having a circular portion and a strip portion extending outwardly therefrom, said sheets being sealed to one another along the circumferential edge of said circular portion and the outwardly extending edges of said strip portion; compressing the circular portion of said device in a manner sufficient to force out entrapped air and allow said liquefied nutrient medium containing microorganisms to completely fill said circular portion; allowing said liquefied nutrient medium to solidify subsequently completely heat-sealing said strip portion to close said receptacle; incubating said device whereby to form microorganism colonies; and counting said colonies.

References Cited

UNITED STATES PATENTS

| | | | |
|---|---|---|---|
| Re. 24,251 | 12/1956 | Kaplan et al. | 206—56 |
| 2,102,858 | 12/1937 | Schlumbohm | 229—515 |
| 2,103,389 | 12/1937 | Salfisberg | 206—56 |
| 2,508,197 | 5/1950 | Singer | 206—56 |
| 2,663,461 | 12/1953 | Brown | 206—56 |
| 2,813,799 | 11/1957 | Bender et al. | 99—171 |
| 2,904,474 | 9/1959 | Borg | 195—139 |
| 3,039,938 | 6/1962 | Charm | 195—139 |
| 3,184,121 | 5/1965 | Volckening | 206—56 |
| 3,203,870 | 8/1965 | Andelin | 195—139 |

ALVIN E. TANENHOLTZ, *Primary Examiner.*